(12) United States Patent
Seymour et al.

(10) Patent No.: US 9,736,764 B2
(45) Date of Patent: Aug. 15, 2017

(54) BLUETOOTH PHONE RECONNECTION STRATEGY

(75) Inventors: Shafer Seymour, Bartlett, IL (US); Robert Gee, Lake Barrington, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 144 days.

(21) Appl. No.: 13/546,711

(22) Filed: Jul. 11, 2012

(65) Prior Publication Data
US 2014/0018000 A1 Jan. 16, 2014

(51) Int. Cl.
*H04B 7/24* (2006.01)
*H04W 48/16* (2009.01)
*H04W 84/18* (2009.01)

(52) U.S. Cl.
CPC ............ *H04W 48/16* (2013.01); *H04W 84/18* (2013.01)

(58) Field of Classification Search
USPC .............................................. 455/41.2, 569.2
See application file for complete search history.

(56) References Cited

U.S. PATENT DOCUMENTS

| | | | | |
|---|---|---|---|---|
| 2003/0032460 A1* | 2/2003 | Cannon et al. | ................ | 455/569 |
| 2004/0053573 A1* | 3/2004 | Karusawa | ............ | H04M 1/7253 455/41.2 |
| 2006/0229014 A1* | 10/2006 | Harada | ................ | H04M 1/7253 455/41.2 |
| 2007/0081506 A1* | 4/2007 | Yamada | ........................ | 370/338 |
| 2007/0238475 A1* | 10/2007 | Goedken | ........................ | 455/512 |
| 2010/0197229 A1* | 8/2010 | Yamashita | .................... | 455/41.2 |
| 2010/0197362 A1* | 8/2010 | Saitoh et al. | ............... | 455/569.2 |
| 2011/0093161 A1* | 4/2011 | Zhou et al. | ..................... | 701/33 |
| 2012/0161927 A1* | 6/2012 | Pierfelice | ................ | H04L 63/10 340/5.83 |
| 2013/0122969 A1* | 5/2013 | Saitoh et al. | ............... | 455/569.2 |

FOREIGN PATENT DOCUMENTS

| | | |
|---|---|---|
| JP | 2010130531 A | 6/2010 |
| WO | 2011/109344 A1 | 9/2011 |

OTHER PUBLICATIONS

Search Report dated Feb. 12, 2013, from corresponding GB Patent Application No. GB1218400.8.

\* cited by examiner

*Primary Examiner* — Nay A Maung
*Assistant Examiner* — Erica Fleming-Hall

(57) ABSTRACT

When a wireless communications module, such as a Bluetooth transceiver in a vehicle, is confronted with numerous devices that it can choose to connect to, one particular device of many is chosen by the Bluetooth transceiver by determining a connection priority for each available, connectible device. Priority can be determined by factors that change over time and for different users and different devices. Examples include time of day, day of the week, direction, who is driving a vehicle, where a vehicle is going, and where a vehicle has been. The importance of any given factor can be user-specified or programmed into the Bluetooth transceiver.

13 Claims, 3 Drawing Sheets

BLUETOOTH PHONE RECONNECTION STRATEGY

BACKGROUND

Wireless communications and wireless management techniques are well known. While there might be different connection management methods in different vehicles, some wireless communications and management implementations such as Bluetooth are user unfriendly.

In many Bluetooth-enabled vehicles, only one device of a given category, e.g., cell phone, media player, navigation device, can be connected to the vehicle's Bluetooth system at any given time. If there is more than one Bluetooth-compatible device in the vehicle, the vehicle's Bluetooth system will typically connect to the first device in each supported category that it finds.

Because some vehicles implement driver distraction prevention systems, it may not be possible to change which device is connected to a Bluetooth system in a moving vehicle. Since a fixed-order list of devices is maintained, there is no mechanism to allow the vehicle to connect an available device that is in a lower position in the list, and no mechanism for selection and connection of devices based on the current operating conditions of the vehicle.

BRIEF SUMMARY

In accordance with embodiments of the invention, when a wireless communications module, such as a Bluetooth transceiver in a vehicle, is confronted with numerous devices that it can choose to connect to, one particular device of many is chosen by the Bluetooth transceiver by determining a connection priority for each available, connectible device. Priority can be determined by factors that change over time and for different users and different devices. Examples include time of day, day of the week, direction, who is driving a vehicle, where a vehicle is going, and where a vehicle has been. The importance of any given factor can be user-specified or programmed into the Bluetooth transceiver.

DETAILED DESCRIPTION

Figure 1:
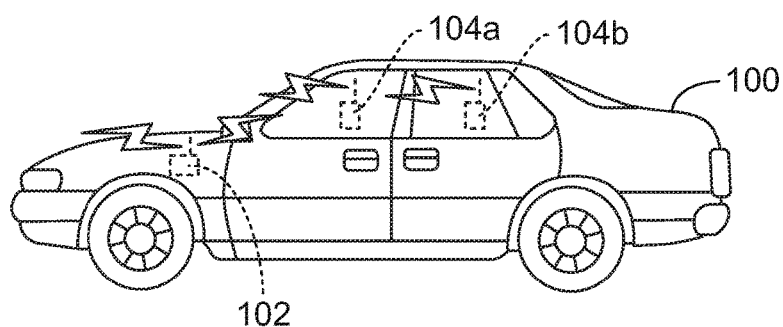
FIG. 1 is a representative view of an automobile with multiple Bluetooth-connectible devices.

FIG. 1 depicts an automobile or other motor vehicle 100 having a wireless communications transceiver 102 capable of communicating wirelessly with multiple wireless communications devices 104A and 104B, when such devices are inside the vehicle 100. In a preferred embodiment, the communications transceiver 102 is embodied as a Bluetooth transceiver but it could just as well be an access point compatible with the IEEE 802.11-type protocols, which are also referred to as Wi-Fi access points.

The communications devices 104A and 104B depicted in FIG. 1 are cell phones. They provide wireless communications to a user. Such communications can be voice communications, or data communications (e.g., text messaging, Internet access). The devices 104A and 104B are typically embodied as cell phones but could also be one or more media players, one or more personal digital assistants (PDA), one or more tablet computers, or one or more other kinds of devices that can be wirelessly connected to a Bluetooth transceiver or other type of access point.

The vehicle's communications module 102 is a Bluetooth radio transceiver that is configured to communicate wirelessly with the portable communications devices 104A and 104B. The communications module 102 is also configured to connect to and communicate with the device that has the highest priority, the highest priority being determined according to a locally defined priority ranking of known devices.

Figure 2:
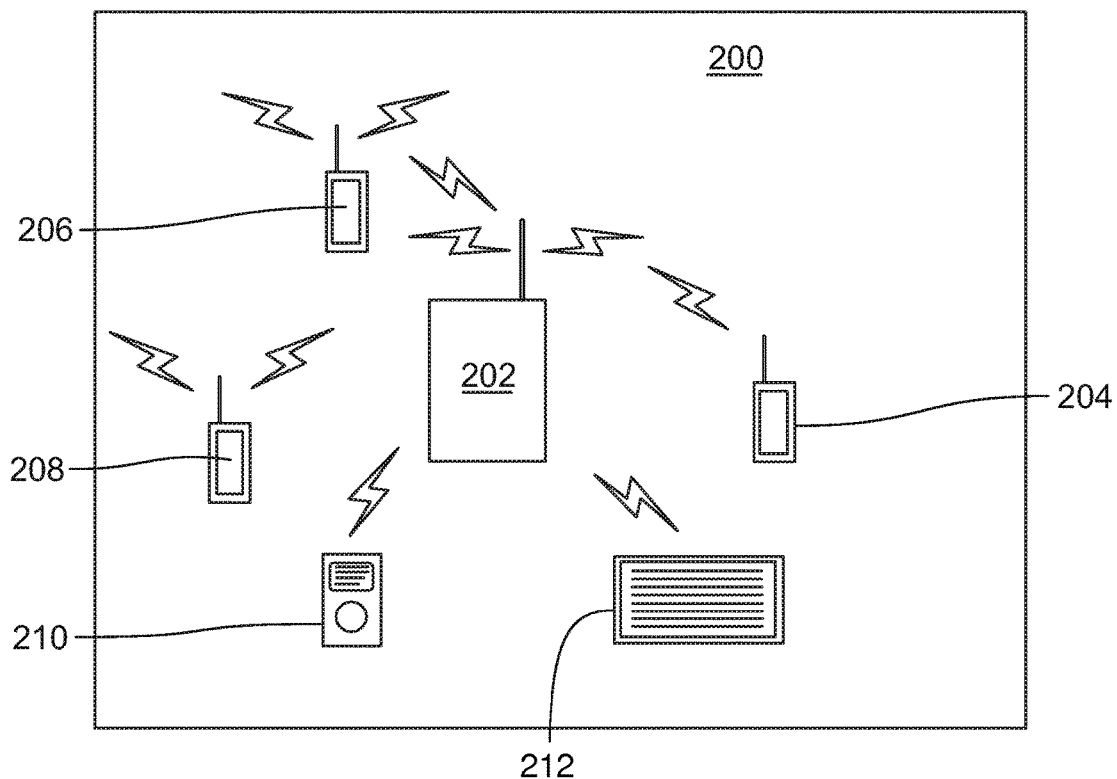
FIG. 2 is a schematic representation of a wireless communication system comprising a wireless communications module and several connectible portable wireless communications devices.

FIG. 2 is a schematic representation of a wireless communications system 200 for use within a vehicle. A wireless communications module 202 is depicted as being within signal range of several different types of "wirelessly connectible" devices that are identified by reference numerals 204, 206, 208, 210 and 212. They include, but are not limited to, cell phones 204, 206 and 208, a Bluetooth-enabled music/media player 210 and a Bluetooth-enabled tablet computer 214.

As described above, a problem with a vehicle wireless communications system is determining which one of several possible devices 204-214 are to be connected to the communications module 202, which is typically capable of connecting to only one device of a particular type (e.g., phone, media player) at a time. As described herein, a Bluetooth reconnection strategy selects a particular device to connect using a prioritization of several different connectible devices 204-214. Prioritization is preferably based on one or more changing or changeable operating conditions that compose all or part of a pool of conditions that can be applied to the task of selecting which device to connect. In another embodiment, the prioritization is determined by an operator selection or operator specification of the prioritization factors.

Figure 3:
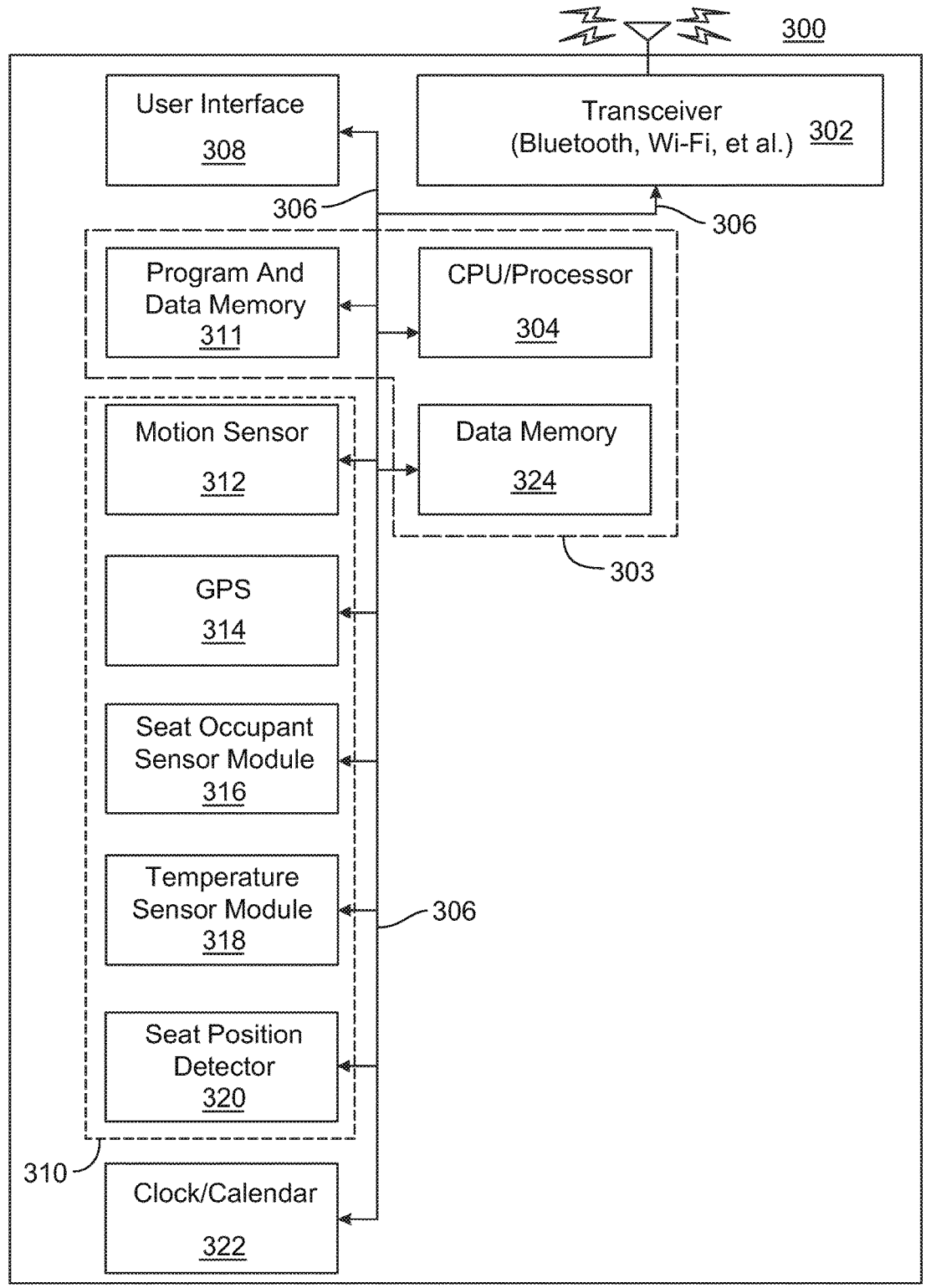
FIG. 3 is a block diagram of a wireless communications module such as a Bluetooth module configured to determine a connection priority of several connectible devices and to connect to the device that has the highest priority.

FIG. 3 is a block diagram of a communications module 300 configured to select one particular device to connect to, from several possible devices, the device that is selected being the one to which the communications module is to be wirelessly connected. The selection of a device for connection to the module is based on a connection priority level of the selected device relative to the several other connectible devices. The communications module 300 is thus configured to connect to the wireless device having the highest-priority of the currently available devices.

Central to the communications module is a wireless transceiver 302, preferably embodied as a Bluetooth transceiver but also capable of being a Wi-Fi or other similar wireless communications device. The transceiver 302 is coupled to a computer 303. The computer 303, which is also known in the art as a controller, comprises a processor or central processing unit (CPU) 304, program and data memory 311, and data memory 324. The transceiver 302 and processor are coupled to each other via a conventional address/data/control bus 306, different embodiments of which are well known in the computer art. The bus 306 also couples the CPU 304 to a user interface 308 through which a user of the communications module 300 can specify operating conditions or parameters including specifying a prioritization list or prioritization factors by which the communications module 300 will select one particular device of many to which it will connect to.

The bus 306 also connects the CPU 304 to one or more non-volatile program and data storage devices, one shown and being identified by reference numeral 311. The program and data memory device 311 is preferably implemented as a so-called flash memory device. It stores executable program instructions and data. When the stored program instructions are executed by the CPU 304, they cause the CPU 304 to perform various different operations described below. The flash memory device 324 is also capable of storing data as those of ordinary skill in the art will recognize.

When the program instructions stored in the memory device 311 are executed by the processor 304, they provide the processor 304 with the algorithms used to determine a connection priority of several connectible portable wireless communications devices such as those shown in FIG. 1 and FIG. 2. The program instructions in the program and data memory 311 also enable the CPU 304 to connect the transceiver 302 to a particular device that has the highest priority of all available devices.

In addition to connecting the CPU 304 to the transceiver 302, the user interface 308 and the program and data memory 311, the bus 306 also connects the CPU 304 to various sensors, the signal outputs of which are referred to herein as vehicle status indicators. Examples of various sensors and the information they output is collectively identified by reference numeral 310.

The different individual status indicators include, but are not limited to signals or information from: a motion sensor 312 such as an integrated circuit accelerometer that is configured to detect whether the vehicle is moving or stationary and to provide a signal that is indicative or representative of motion; a global positioning system (GPS) navigation device 314, which can provide location information, speed or velocity and direction information as well; one or more vehicle seat occupant sensors 316, configured to provide information to the CPU as to whether a seat in the vehicle is occupied and if so, how many occupants are in the vehicle and where they are seated; a temperature sensor 318, configured to provide an output signal representative a temperature, and a driver's seat position detector 320, which provides information to the CPU 304 from which it can be determined which driver of many might be driving the vehicle. A compass (not shown) that provides a direction-of-travel signal can be added. A clock/calendar 322 that provides time and/or date information can be provided. The clock/calendar 322 can also store information about appointments, i.e., places to be or persons to see at specific dates and/or times. Information from the clock/calendar in combination with information from the other sensors can help identify which Bluetooth device of many should be prioritized to be connected to the transceiver 302.

As stated above, in an alternate embodiment, a user can specify the prioritization order of a list of devices. A separate data memory 324 is thus depicted as being part of the communications module 300 as a representation of where such information could be stored.

Figure 4:
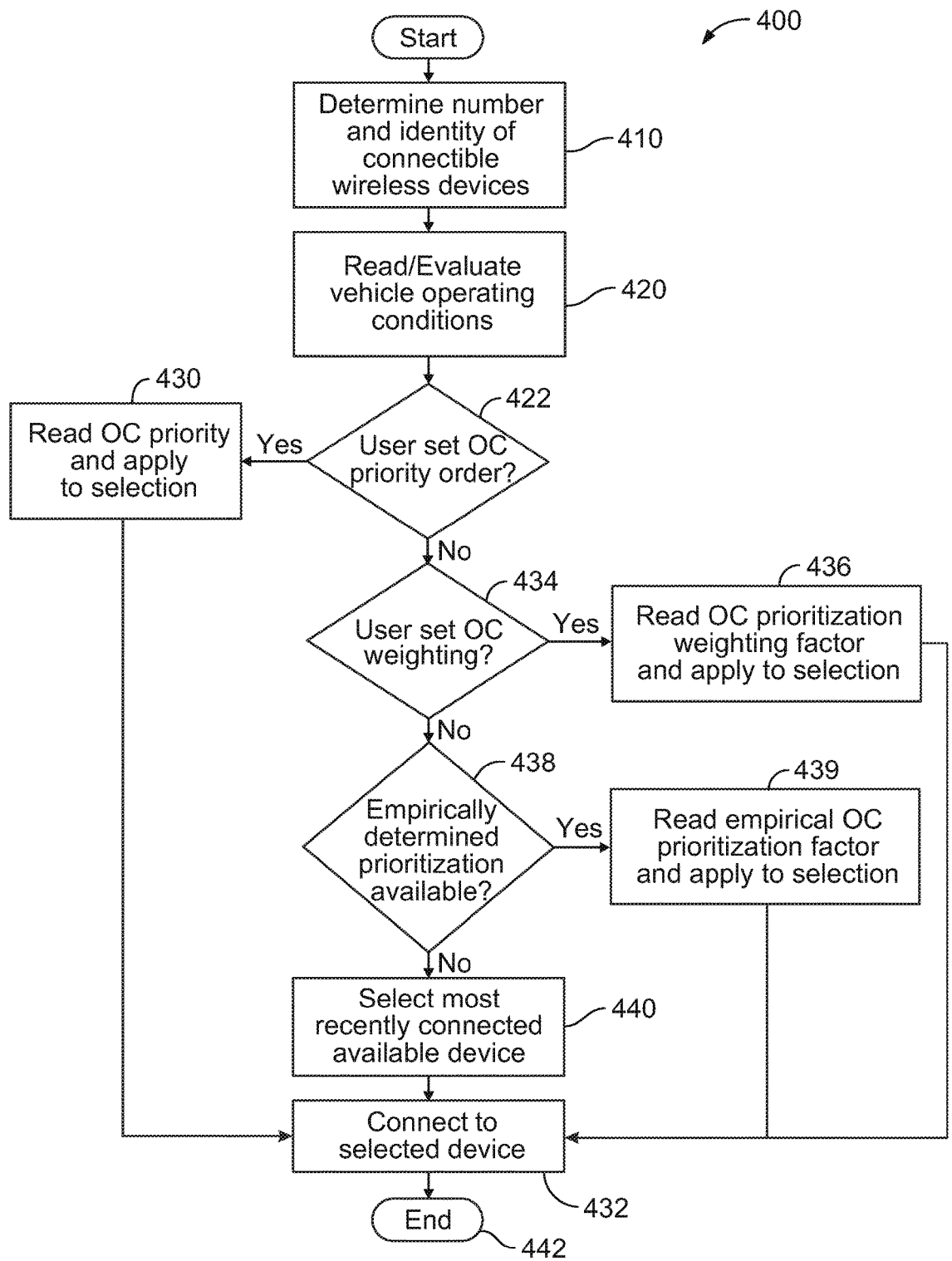
FIG. 4 is a chart depicting steps of a method for connecting a portable wireless communications device to a wireless communications module.

FIG. 4 depicts steps of a method 400 for the communications module 300 to select a particular device to connect. The method begins at step 410 where the communications module 300 shown in FIG. 3, wirelessly determines the number and identity of available, connectible wireless devices using conventional techniques. The connectible devices, i.e., those that are available to wirelessly connect to the communications module 300, include, by way of example, the devices shown in FIGS. 1 and 2.

After the number and identity of available, connectible wireless devices is determined by the communications module 300, at step 420, one or more of the various operating conditions or status indicators can be read or evaluated by the controller or CPU 304. The particular operating conditions and/or status indicators and their importance can be set or specified by a user through the user interface 308 or, determined under software control, i.e., by programmed instructions.

The information obtained at step 420 can include the date, day of the week, time of day, the location of the vehicle, and whether the vehicle is in motion. The information obtained in step 420 can also include the direction of the vehicle, who is seated in the driver's seat, how many passengers are in the vehicle, and whether the available devices have any service restrictions or service plan details that would restrict or prioritize the connectible devices differently. In addition, the information analyzed in step 420 can include route and destination data from a navigation system and appointment information made available from a calendar management system. The information obtained at step 420 is that which is available from the status indicators collectively identified by reference numeral 310 or which might be available in the data memory 324 or stored in the program and data memory device 311.

It is important for purposes of claim construction to note herein that the data or information obtained from the status indicators is dynamic in that it can change continuously as the vehicle is operated; it can also change from one day to the next or from one week to the next. The operating conditions detected by the various status indicators 310 is thus considered to be dynamic operating conditions which in one embodiment can be prioritized or selected by a user or preprogrammed by the instructions stored in the program and data memory device 311. At step 422, a determination is made whether a vehicle user has set an operating condition (OC) prior order.

If the test at step 422 is true, the method proceeds to step 430, where the method reads an operating condition prioritization order from either the program and data memory 311 or a data memory device 324. The operating condition prioritization order determines a sequence or ordering of which operating conditions from the status indicators will be used first, second, third and so forth to determine to which wireless communications device the module will connected, which takes place at step 432.

If the test at step 422 is false, which means the user did not set his or her own OC order, the method proceeds to step 434, where a test or determination is made at step 434 whether the user set or specified, an OC weighting factor for various different OCs. Of the various operating conditions that are read from the status indicators 310, they can be weighted by either a user-supplied value or a value preprogrammed into the program instructions. By way of example, a seat position detector 320 might be able to conclusively identify the occupant and user of the vehicle as a particular person based on the location at which a seat is positioned. If the seat is in a particular position, the program instructions can preferentially identify a particular Bluetooth device to connect based upon an assumption that, if the driver's seat is in a particular location, a particular driver is seated in the driver's seat and that particular driver's phone should be connected.

Some keyless-entry systems use a small wireless transmitter to lock and unlock the vehicle's doors. The wireless transmitters for a particular vehicle can be configured to transmit a signal carrying data that uniquely identifies each of the different key fobs. Driver identification could therefore also be determined by other means, such as the particular key fob in use and one or more pieces of data that identify a particular fob with a particular driver. Information carried on a signal from a key fob that identifies a particular driver is considered herein to be driver key fob information.

If a user-specified OC weighting factor exists, the method proceeds to step 436, where the OC prioritization weighting factors are read from memory and applied to the various operating conditions in order to make a selection as to which device to enable/connect to at the aforementioned step 432.

If the test at step 422 fails and the test at step 434 fails, the method proceeds to step 438, where another test is executed by which a determination is made whether an empirically determined operating condition prioritization table exists. Determining a prioritization empirically is based upon an experience or observation of how known Bluetooth devices are selected, over time, by a user manually connecting a specific phone to the communications module. The system thus learns which phone, or other Bluetooth-connectible device should be connected, and under what operating conditions. If such data exists, i.e., the test performed at step 438 is true or "yes," the method proceeds to step 439 where the operating condition (OC) prioritization data/information is read, preferably from a list or table, and the prioritization factors in the list or table are used to select a particular device to connect to at step 432.

If all of the tests performed at steps 422, 434 and 438 fail, which happens if there is no user-specified operating condition priority order (test at step 422 fails) and there is no user-specified operating condition weighting factor (test at step 434 fails and there is no empirically-determined prioritization table or factor (test at step 438 fails), the method shown in FIG. 4 proceeds to step 440, which is a step where the most-recently selected wireless device is identified as the device that is to be connected to again. That device is then connected at step 432.

Regardless of the tests that are performed, after a device is connected at step 432, when the vehicle is shut off, the device is disconnected at step 442. The method 400 is repeated the next time a wireless device is to be connected.

Once the connectible device with the highest priority factor or level is determined, the communications module initiates a connection with the highest priority available device. In a preferred embodiment, the communications module 300 periodically re-evaluates the priorities of available devices, the frequency or rate of the re-evaluation being a design choice. The communications module 300 may also monitor the vehicle for trigger events, e.g., a passenger leaving, or entering the vehicle. The communications module 300 can disconnect the currently connected device and connect a higher priority device at any time, or as allowed by user preferences and program instructions.

When a connection is established between the communications module 300 and a particular device, the communications module will periodically re-scan for available devices. If a higher-priority device comes into signal range of the communications module 300, and is detected by the communications module 300, while it is connected and communicating with a lower-priority device, the communications module 300 can optionally terminate the existing connection with a first device and connect to a more-recently arrived, higher-priority device.

The wireless device reconnection strategy described above can be used in a variety of different scenarios. In a first scenario, a vehicle equipped with a communications module 300 as described above can associate a specific wireless device communications device 204, 206, 208 or 210 with a specific driver. An association of a device to a driver can be made either via the user interface 308 or by the wireless transceiver 302 keeping track of which wireless communications device 204, 206, 208 or 210 connects with the communications module 300 when only the driver is in the vehicle.

If the vehicle 100 is capable of identifying a driver by a particular wireless key fob, driver biometric information such as the driver's speech, retina, or a visual recognition system, the communications module 300 can associate a particular wireless communications device 204 that happens to be in the vehicle when there are no passengers in the vehicle 100 and only the driver is present. Thereafter, when the same driver's device 204 is detected in the vehicle 100 along with other devices 206, 208 and/or 210, the communications module 300 can preferentially connect to the driver's device 204 ahead of the other devices 206, 208 and 210.

In another scenario two or more people car pool, i.e., they share the use of the same car and drive to work together, but their uses of the one car vary depending on the day of the week. Assume that a first person drives the car on Monday, Wednesday and Friday and uses a first key fob to open, start and operate the car. Assume too that a second person drives the car on Tuesdays and Thursday but uses a second and different key fob. Since the car 100 and the communications module 300 can determine who is driving the car on Monday, Wednesday and Fridays by the first key fob and determine who is driving on Tuesdays and Thursdays by the second key fob, the communications module 300 can be configured to preferentially connect with the first person's wireless device on Mondays, Wednesdays and Fridays and preferentially connect to the second person's wireless device on Tuesdays and Thursdays, simply by keeping track of which key fob is used to open, start and/or operate the vehicle 100 and by using information obtained from the clock/calendar 322.

In another scenario, if a first connected wireless device 204 is connected to the communications module subsequently requests the communications module 300 to disconnect from the device 204, the communications module 300 can be configured to attempt to re-connect to a second and different wireless device 206, 208 or 210 based upon next-device selection rules that can either be in place or that can be put in place at the time of the disconnection of the first device 204. A next-device selection rule can simply be to connect to a device that is next in a list. Next-device selection rules can also be more complex, such as a selection based on weighting of one or more indicators or data obtained from the various sensors 312, 314, 316, 318 or 320 as described above. The communications module 300 will nevertheless be re-connected to another wireless device 206, 208 or 210 according to steps depicted in FIG. 4.

In another scenario, consider when a first wireless device 204 is wirelessly connected to the communications module 300 but the first device 204 is not the driver's device. If the vehicle 100 stops moving and the connection with the first wireless device 204 is dropped or terminated during the stop, if the vehicle 100 detects one less passenger when the vehicle 100 starts moving again, the wireless device 206, 208 or 210 having the highest priority will be the device to which the communications module 300 is re-connected using steps depicted in FIG. 4.

In another car pooling scenario, wherein multiple wireless devices 204, 206, 208 and 210 are in the vehicle 100 and each of them is capable of being connected to the communications module 300, data that includes time-of-day and/or, day-of-week data from the clock/calendar 322 can be used by the communications module 300 to select a particular device 204, 206, 208 and 210 to connect or re-connect to. If for example a first person in the vehicle 100 (driver or passenger) has a regularly scheduled business conference call on Mondays at 8:00 AM and a second person (driver or passenger) sometimes retrieves voice mail messages between 8:00 and 8:30 AM, the first person's 8:00 AM conference can be given a higher weighting factor, higher priority than the second person's connection to retrieve voice mail between 8:00 AM and 8:30 AM. The communications module 300 will thus connect to the first person's wireless device, even if the second person happens to be driving.

In a somewhat more complicated scenario, consider multiple wireless communications devices 204, 206, 208 and 210 located in a vehicle 100 that will travel over a long route in which service coverage by different wireless service providers will change or are likely to change. If different devices 204, 206, 208 and 210 have different radio operating characteristics such as different receiver sensitivities, different transmitter power levels and/or different battery life, different devices 204, 206, 208 and 210 can be selected along the route as a preferred device to be connected to by the communications module 300 using weighting factors applied to various radio operating characteristics of the different devices. Similarly, if different devices 204, 206, 208 and 210 are associated with different service providers, a device 204 can be selected or de-selected from the others 206, 208 and 210, along the route based on a determination of which device is not roaming or roaming.

The communications module 300 can also select a device to connect to, based on one or more operating features of a wireless device. Consider a communications module 300 that provides a wireless connection to a first phone 204 having a service plan that does not include messaging whereas a second phone 206 has a service plan that does. If a text message needs to be sent from a vehicle's reporting system, a text message is created by the vehicle 100 that will need to be sent.

The communications module 300 can be configured to keep both phones connected, with the second phone providing messaging service to the vehicle 100. It can also be configured to keep only the first phone connected for voice communications and connect the second phone for messaging on an as-needed basis. The communications module can also select a device to connect to, based on a user's service plan minutes, data messaging limitations, load balancing, or preferential routing of requests based on cost. One phone might have unlimited text messaging or unlimited voice call minutes while another phone does not.

In yet another scenario, the communications module 300 can select a particular device 204, 206, 208, 210 to connect to, using a calendar or schedule of a user of a device 204, 206, 208, 210. If two people use the same vehicle 100, one of them can choose to enable a calendar functionality of his or her device 204 to be linked and/or synchronized to the clock/calendar 322. The processor 304 can periodically check the clock/calendar 322 for dates and times when a particular wireless device 204, 206, 208, 210 needs to be connected to, in order to enable the user of the device to satisfy a scheduled requirement for communications. By way of example, if the communications module 300 knows that a particular person has a need to place or receive telephone call on a particular date at a particular time, the communications module can prioritize the wireless communications device associated with that particular person.

The determination of a need for a connection can be made by an explicit command or instruction. Determining when a connection is needed can also be made by searching calendar entries for particular key words.

For purposes of claim construction, the processor or CPU 304, the instructions it executes, and the memory device 311 and/or 324 wherein instructions and/or data can be stored, perform the prioritization determinations and priority comparisons. The CPU 304, its instructions and the memory devices wherein those instructions and/or data are store are therefore considered herein to be a prioritizer. The determination of a connection priority of a wireless device 204, 206, 208 and 210 in the vehicle 100 is thus made by the communications module 300, which is part of the vehicle 100. A wireless device's connection priority determination is not made by the device or by a wireless service provider.

Furthermore, the CPU 304, the instructions it executes and the memory device 311 and/or 324 wherein instructions and/or data can be stored, effectuate the connection of the communications module 300 to a particular device from the available devices pool. The CPU 304, its instructions and the memory devices wherein those instructions and/or data are store are therefore considered herein to be a connector. The bus 306 can also be considered to be a connector.

Those of ordinary skill in the art will recognize that the foregoing description is only for purposes of illustration. The true scope of the invention is set forth in the appurtenant claims.

The invention claimed is:

1. In a wireless communications system comprising a vehicle-located wireless communications module and a plurality of portable wireless communications devices within the vehicle, which can be wirelessly coupled to the vehicle-located wireless communications module, a method of selecting a particular portable wireless communications device to wirelessly couple to the vehicle-located communications module, the method comprising the steps of:
   determining a connection priority for each device of the plurality of portable wireless communications connectible devices within the vehicle, the connection priority being determined by the vehicle-located wireless communication module from a dynamic vehicle operating condition, at least one portable wireless communications device having a highest priority, the dynamic vehicle operating condition being at least one operating condition of the vehicle, which can change continuously as the vehicle is operated, the dynamic vehicle operating condition being provided to and evaluated by the vehicle-located communications module;
   wherein determining a connection priority for each device of the plurality of portable wireless communications connectible devices within the vehicle further comprises:
      determining whether a user specified an operating conditions priority order, and
      when the user has specified an operating conditions priority order, applying the user-specified operating conditions priority order;
   wirelessly coupling the portable wireless communications device having the highest-priority, to the vehicle-located wireless communications module, the wireless coupling to the vehicle-located wireless communications module being made by said vehicle-located wireless communications module;

wherein a plurality of selection rules are configured to select a portable device to wirelessly couple to the vehicle-located communications module responsive to vehicle operating information obtained from a vehicle sensor;

wherein determining a connection priority for each device of the plurality of portable wireless communications connectible devices within the vehicle further comprises:

when the user has not specified an operating conditions priority order, determining whether the user specified an operating conditions weighting; and when the user has not specified an operating conditions priority order and the user has specified an operating conditions weighting, then applying the user specified operating conditions weighting.

2. The method of claim 1, wherein the vehicle sensor is at least one of: a vehicle motion sensor; a navigation system; a vehicle seat occupant sensor; and a temperature sensor.

3. The method of claim 1, wherein the selection rules are configured to select a portable device to couple to the vehicle-located communications module using at least one of: a clock and a calendar.

4. The method of claim 1, wherein the at least one dynamic vehicle operating condition is selected empirically by the communications module.

5. The method of claim 1, wherein the step of determining a connection priority comprises an empirical ordering of possible dynamic vehicle operating conditions by the communications module.

6. The method of claim 1, wherein the at least one vehicle operating condition has a value, which is determined empirically by the communications module.

7. A communications module for a motor vehicle, the communications module comprising:

a radio frequency transceiver within the motor vehicle and configured to send radio frequency signals to and receive radio frequency signals from, compatible portable wireless communications devices inside the motor vehicle;

a prioritizer within the vehicle and coupled to a plurality of sensors for the motor vehicle, the prioritizer being additionally coupled to the radio frequency transceiver, the prioritizer being configured to determine a connection priority of a plurality of wireless communications devices inside the vehicle, from a plurality of dynamic vehicle operating conditions provided to the prioritizer by at least one of the plurality of sensors, the prioritizer being configured to determine a priority indicator for the wireless communications device having a highest priority, the prioritizer being configured to: determine whether a user specified an operating conditions priority order and, if the user specified an operating conditions priority order, apply the user-specified operating conditions priority order; and a connector within the vehicle and coupled to the transceiver and prioritizer, the connector being configured to effectuate wireless connection of the radio frequency transceiver to the portable wireless communications device having the highest priority;

said dynamic vehicle operating conditions being a plurality of operating conditions of the motor vehicle that can change continuously as the vehicle is operated; and wherein the prioritizer is further configured to:

when the user has not specified an operating conditions priority order, determine whether the user specified an operating conditions weighting; and when the user has not specified an operating conditions priority order and the user has specified an operating conditions weighting, then apply the user specified operating conditions weighting.

8. The communications module of claim 7, further comprising a vehicle status indicator coupled to the prioritizer, the status indicator being at least one dynamic vehicle operating condition sensor and providing at least one of;

a date;
day of the week;
time of day;
an indication of motion;
an indication of a direction;
route or destination information from a navigation system;
an indication that a seat is occupied;
a temperature;
and
a database of portable wireless communication device operating parameters and conditions.

9. The communications module of claim 8, wherein the prioritizer and connector comprise:

a processor coupled to the transceiver and the user interface; and at least one non-transitory memory device coupled to the processor, the at least one non-volatile memory device storing program instructions which, when executed, cause the processor to:

determine a connection priority of a plurality of portable wireless devices that are connectible to the transceiver, each portable wireless device having a relative connection priority; and establish a wireless connection between the communications module and one portable wireless device having the highest relative connection priority.

10. The communications module of claim 9, wherein the program instructions are configured to determine a connection priority by selecting a connectible device from a plurality of devices based on at least one dynamic operating condition that is selected by the processor from a plurality of possible dynamic operating conditions.

11. The communications module of claim 9, wherein the program instructions are configured to determine a connection priority by selecting a connectible device from a plurality of devices based on at least one dynamic operating condition that is selected by a user of the communications module.

12. The method of claim 1, wherein determining a connection priority for each device of the plurality of portable wireless communications connectible devices within the vehicle further comprises:

when the user has not specified an operating conditions priority order and the user has not specified an operating conditions weighting, then determining whether an empirically determined prioritization is available; and if the user has not specified an operating conditions priority order, and the user has not specified an operating conditions weighting, and an empirically determined prioritization is available, then applying the empirically determined prioritization.

13. The communications module of claim 7, wherein the prioritizer is further configured to:

when the user has not specified an operating conditions priority order and the user has not specified an operating conditions weighting, then determine whether an empirically determined prioritization is available; and if the user has not specified an operating conditions priority order, and the user has not specified an operating conditions weighting, and an empirically determined prioritization is available, then apply the empirically determined prioritization.

\* \* \* \* \*